United States Patent
Decime

(10) Patent No.: US 7,657,640 B2
(45) Date of Patent: Feb. 2, 2010

(54) METHOD AND SYSTEM FOR EFFICIENT ROUTING OF CUSTOMER AND CONTACT E-MAIL MESSAGES

(75) Inventor: Jerry B. Decime, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2342 days.

(21) Appl. No.: 09/746,365

(22) Filed: Dec. 21, 2000

(65) Prior Publication Data

US 2002/0083181 A1 Jun. 27, 2002

(51) Int. Cl.
- G06F 15/16 (2006.01)
- G06F 17/30 (2006.01)
- G06F 15/00 (2006.01)
- H04M 3/00 (2006.01)

(52) U.S. Cl. ........... 709/230; 709/206; 707/531; 719/331; 379/265.02; 379/266.01; 379/265.12; 379/266.06; 715/536

(58) Field of Classification Search ........... 709/203, 709/206, 207, 230; 707/8–10; 719/331; 379/265.02, 265.12, 266.01, 266.06; 715/536
See application file for complete search history.

(56) References Cited

U.S. PATENT DOCUMENTS

| | | | | |
|---|---|---|---|---|
| 5,937,422 A | * | 8/1999 | Nelson et al. | 715/531 |
| 6,058,435 A | * | 5/2000 | Sassin et al. | 719/331 |
| 6,263,066 B1 | * | 7/2001 | Shtivelman et al. | 379/266.06 |
| 6,496,580 B1 | * | 12/2002 | Chack | 379/266.01 |
| 6,556,671 B1 | * | 4/2003 | Beauvois | 379/265.02 |
| 6,584,192 B1 | * | 6/2003 | Agusta | 379/265.12 |
| 6,623,529 B1 | * | 9/2003 | Lakritz | 715/536 |
| 6,718,367 B1 | * | 4/2004 | Ayyadurai | 709/206 |

FOREIGN PATENT DOCUMENTS

EP 1 024 447 A2 * 2/2000

OTHER PUBLICATIONS

Novell's Breakthrough Language Identifier, Newsbytes, Aug. 4, 1997.*
Support your e-commerce with an e-center, World Trade v13n7, pp. 66-68, Jul. 2000.*
Talisma Enterprise's Multiple Language Capabilities Enable Companies to Build Strong Global Customer Relationships, PR Newswire, Aug. 10, 2000.*
CyberShop.com Adopts Business Evolution Inc.'s @Once Service Center Platform to Handle Internet Customer Service, Business Wire, p. 1198, Nov. 18, 1999.*

* cited by examiner

Primary Examiner—Philip C Lee

(57) ABSTRACT

After a client or potential client accesses the web-site of a host organization and generates an e-mail to the organization, an e-mail sorting and routing system parses the meta-tags appended to the message to appropriately sort and route the message. The meta-tags specify the language of the client, i.e., the language in which the web-site was communicating with the client when the message was generated. The meta-tags also specify the topic, e.g. a product or service, about which the message was written. This information may be input by the client or ascertained from the content or purpose of the web-page from which the e-mail was generated. The messages are then sorted, first by language and then by topic. As a result, each message is quickly routed to a person qualified as to both language and subject matter who can respond to the client.

22 Claims, 3 Drawing Sheets

METHOD AND SYSTEM FOR EFFICIENT ROUTING OF CUSTOMER AND CONTACT E-MAIL MESSAGES

FIELD OF THE INVENTION

The present invention relates to the fields of the Internet or World Wide Web and electronic mail ("e-mail"). More specifically, the present invention relates to the field of web-sites used by companies and other organizations to interface with and provide information to clients, customers, potential customers, patrons, etc. The present invention provides a novel system and method for routing e-mail messages generated by clients using an organization's web-site so that the message can be responded to quickly in the appropriate language and by someone knowledgeable in the area regarding the client's query.

BACKGROUND OF THE INVENTION

Much has been written about the revolutions in communication and business caused by the Internet and the World Wide Web (the "Web"). The Internet and Web make it possible for people around the world to rapidly and inexpensively send messages and access information on almost any topic.

Using an e-mail system, a user can access the Internet, type a message and an address and have that message delivered almost instantly to the recipient's e-mail system anywhere in the world. Digital documents, pictures, sound recordings, spread sheets, video and even computer programs can be attached to an e-mail message and sent to the computer of a designated recipient. Consequently, e-mail provides an incredible medium in which information can be communicated.

In addition to its private uses, e-mail has an equal or greater use in supporting commercial communication. Employees and officers within a business organization may use e-mail to communicate with each other in completing their tasks. Similarly, e-mail may be used to communicate with people at other business organizations to, for example, negotiate contracts, place orders, request information, etc.

Business and other organizations also use e-mail to communicate with clients, customers, potential clients, patrons, potential patrons, etc. (referred to hereinafter collectively as "clients"). Business and other organizations may collect or purchase the e-mail addresses of clients so that e-mail messages can be provided to those clients. Such messages may, for example, advise the client of new products or services being offered, advise the client of reductions in price or other special deals regarding the organization's products and services, request information from or about the client, or educate the client about the organization and/or its products or services.

Businesses and other organizations can also provide such information to clients through a web-site on the Web. At a typical web-site, the client may access information about the organization, its products or services, its personnel, job opportunities, its policies, etc. However, it is a challenge to anticipate all the questions clients will have and organize the information on a web-site so that the information the client desires is readily locatable. If the web-site fails to contain the information desired, or the client cannot find the information on the web-site, an opportunity to develop a relationship with that client will be lost.

Consequently, the web-sites of many businesses and other organizations provide the capability to generate and send e-mail messages to the organization. Thus, if the client using the web-site is unable to obtain the information he or she desires from the web-site, that client can generate an e-mail message to the organization requesting the specific information the client requires. The organization then has the opportunity to respond and foster its relationship with that client.

While incredibly valuable and useful to business and other organizations, this mechanism of interfacing with clients is complicated by the world-wide nature of the Web. Clients may be accessing the organization's web-sites and generating e-mail messages in many languages around the world. Consequently, to provide adequate customer service, the organization must have some means of responding to each client in that client's language and with the information required.

Consequently, there is a need in the art for a system and method of effectively routing e-mail messages generated by clients at an organization's web-site so that the client can be efficiently responded to in his or her own language and by an agent of the organization knowledgeable about the product, service or other aspect of the organization about which the client has written.

SUMMARY OF THE INVENTION

The present invention provides a system and method of effectively routing e-mail messages generated by clients at an organization's web-site so that the client can be efficiently responded to in his or her own language and by an agent of the organization knowledgeable about the product, service or other aspect of the organization about which the client has written. Additional advantages and novel features of the invention will be set forth in the description which follows or may be learned by those skilled in the art through reading these materials or practicing the invention.

The present invention may be embodied and described as an e-mail sorting and routing system for e-mail messages generated through a web-site or web-sites operated by a host organization. The system includes a web server or servers for providing a web-site or web-sites at which clients generate e-mail messages to the host organization; and at least one response server for sorting the e-mail messages. The e-mail messages are sorted first by language and then by topic.

Preferably, the web-site appends meta-tags to each e-mail message as it is generated. The meta-tags identify a language and topic of that message. Consequently, the response server can sort the e-mail messages using the meta-tags. Preferably, all messages generated at the web-site or web-sites are sent to a global mail box for sorting. Preferably, the global mail box operates according to Post Office Protocol 3.

The system further includes a number of language-specific mail boxes into which the e-mail messages are sorted according to language. The system also includes a number of topic-specific mail boxes into which the e-mail messages are sorted according to topic. Each language-specific mail box is associated with a separate corresponding set of topic-specific mail boxes.

A plurality of agent user interfaces, each of which is associated with a topic-specific mail box, are also provided. A user qualified as to language and topic uses one of these interfaces to access messages in the associated topic-specific mail box and respond to the client appropriately.

The present invention also encompasses the methods of making and operating the system described above. For example, the present invention encompasses a method of sorting and routing e-mail messages generated through a web-site or web-sites operated by a host organization at which clients generate e-mail messages to the host organization. The method is performed by sorting the e-mail messages by language; and subsequently sorting the e-mail messages by topic.

The present invention also encompasses the computer-readable instructions or software for implementing the system and method described above. Specifically, the present invention encompasses a set of computer-readable instructions recorded in a medium for storing computer-readable instructions, where the instructions causing a computer system to sort and route e-mail messages generated through a web-site or web-sites operated by a host organization at which clients generate e-mail messages to the host organization. Specifically, the instructions cause the computer system to sort the e-mail messages by language; and subsequently, sort the e-mail messages by topic.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Using the drawings, the preferred embodiments of the present invention will now be explained.

Figure 1:
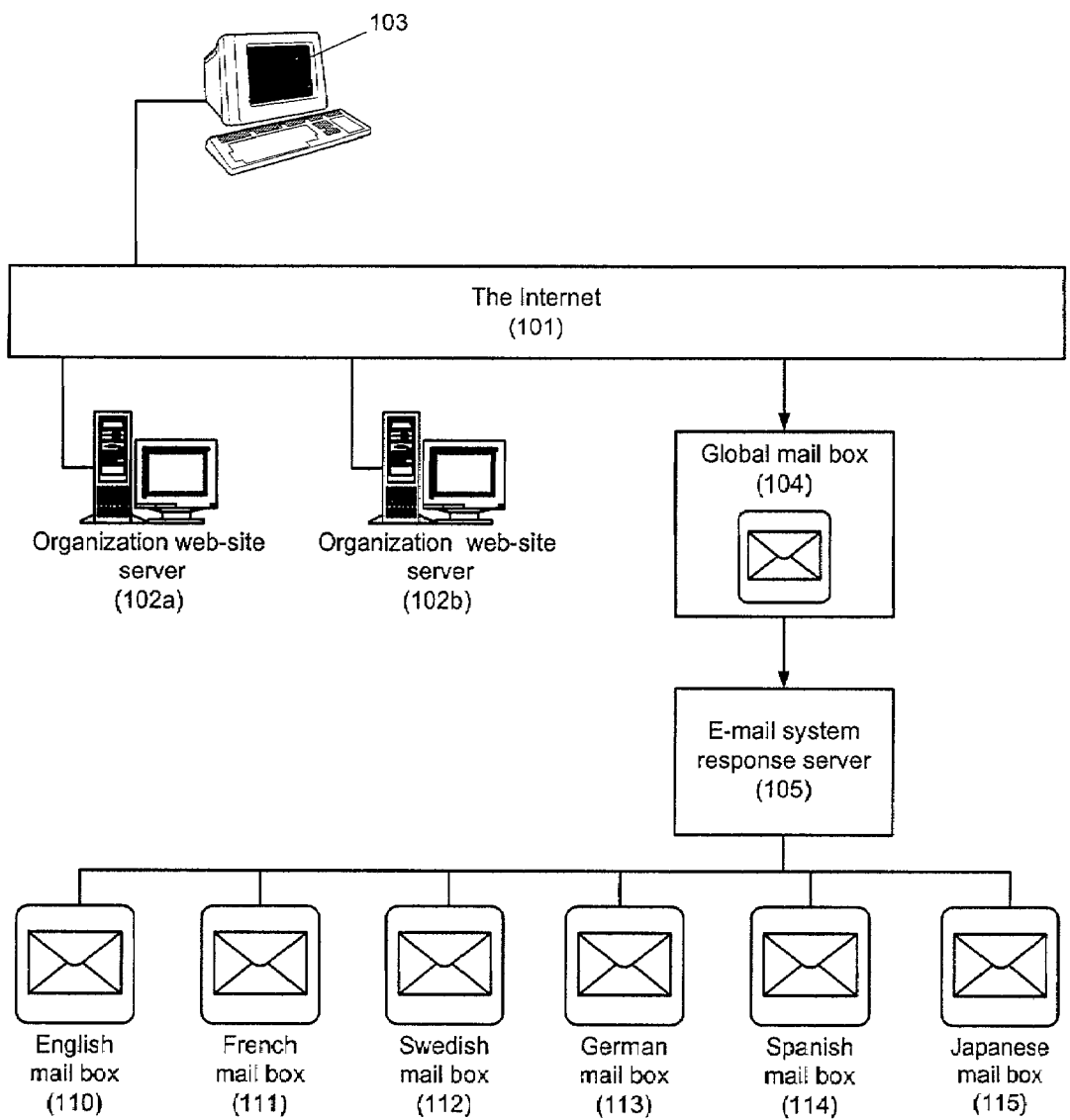
FIG. 1 is a block diagram of an e-mail generating and routing system using an organization's web-sites according to the present invention.

As shown in FIG. 1, the Internet (101) provides communication between a client's computer system (103) and an organization's web servers (102a, 102b). As used herein, the term "host organization" will refer to the organization that provides the web server(s) (102a, 102b) used by a client to generate an e-mail message to that organization. The host organization may be any type of organization, for example, a business, professional, charitable, social or other organization, whether commercial or not-for-profit.

Using his or her computer (103), which is connected to the Internet (101), a user can input an appropriate Universal Resource Locator (URL) to access a web-site of the organization. Inputting the URL sends a request to the web server specified by that URL to transmit a file, i.e., a page of the organization's web-site, back to the requesting computer (103). Web pages are typically in Hyper Text Markup Language (HTML) and are transmitted in response to a request from a user according to Internet Protocol (IP).

As shown in FIG. 1, an organization may have multiple servers (102a, 102b) connected to the Internet (101). These servers (102a, 102b) may have the same or different URLs. Each server (102) may be dedicated to providing a web-site in a particular language, such as English, Spanish or Japanese. Consequently, speakers of that language will be directed to access that server when seeking to communicate with the host organization.

When the requesting computer (103) receives the web-page file, browser software running on the computer (103) into which the URL was entered, is used to display the web-page. As described above, the pages of the web-site can be used to provide a wealth of information to the user. Additionally, the user can enter information into fields in the displayed web page and return that information to the organization's servers (102a, 102b). Specifically, the user can fill out a form and transmit the entered information to the organization as an e-mail message.

In FIG. 1, the user (103) accesses the web-site of the host organization by communicating via the Internet (101) with the web server(s) (102a, 102b) of the organization. If the user does not find the information he or she is looking for or wishes more direct communication with the organization, the web-pages of the organization will include an e-mail form where the user can enter a comment or question and send that message to the organization as an e-mail message. The user may be able to direct the e-mail to select a particular person or department within the organization to which the message will be sent.

If the message is not directed to a particular person, the web page file that allows the user to generate the message will direct the message to a global e-mail box (104). This global box (104) may be resident on the same server (102a or 102b) that is providing the web-page file, or may be another server connected to the Internet (104).

Preferably, the global e-mail box (104) is a POP3 box. POP is short for Post Office Protocol which is a standard protocol in the Internet environment for handling e-mail messages. POP3 is the third and latest version of the POP standard. Alternatively, the global e-mail box (104) may operate according to some other protocol, such as Internet Message (or Mail) Access Protocol ("IMAP").

The global e-mail box (104) may be resident on or accessed by an e-mail system response server (105). It is the purpose of this server (105) to sort the e-mail messages according to the language in which they are written. A separate mail box, preferably resident on the response server (105), is provided to receive those e-mail messages received in a particular language. In the example illustrated in FIG. 1, the e-mail messages may be sorted among an English mailbox (110), a French mailbox (111), a Swedish mailbox (112), a German mailbox (113), a Spanish mailbox (114) and a Japanese mailbox (115).

In order for the user to interact with a web-page, that web-page must be in a language understood by the user. Consequently, an organization provide a web-page which is to be used and understood by users who speak multiple languages has several options for providing such multi-lingual web-pages. One option is to provide a number of different web-sites, each having its own URL, where each web-site is in a specific language. Consequently, users who speak that language will be directed to that particular web-site. In another option, the organization may have a first page to the web-site which requests that the user recognize and identify his or her preferred language. After this selection is made, the user is linked to a new web-site or is provided with a version of the current web-site which is in the specified language.

As a result, when a user fills out an e-mail form at the organization's web-site, the web server (102a, 102b) will be communicating with the user in a particular language that the user presumably understands and in which the users will presumably draft the e-mail being sent to the organization. An indicator of this language is appended to the e-mail message that is sent to the global box (104) as a meta-tag.

Consequently, when the response server (105) accesses the e-mail messages received in the global mail box (104), the server (105) parses the meta-tags associated with the message to find the meta-tag that specifies the language in which the message was written. The message is then allocated to the appropriate mail box (110-115) in accordance with the language specified by the language meta-tag.

In this way, the messages from clients can be automatically routed to someone within the organization who speaks the client's language. This greatly enhances the organization's response to the client and the goodwill generated with the client as a result of the organization's response.

Figure 2:
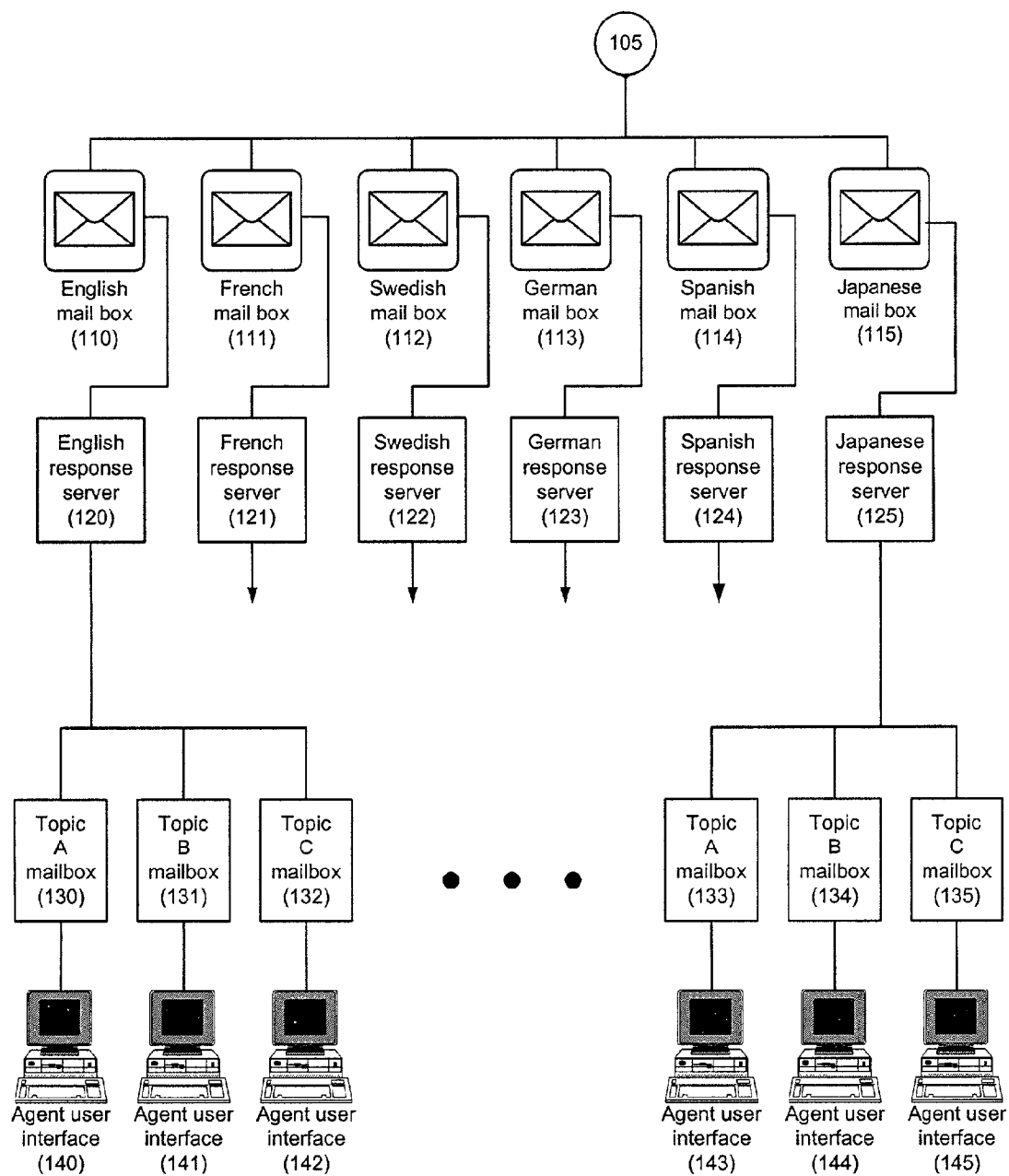
FIG. 2 is a block diagram of more of the system illustrated in FIG. 1.

FIG. 2 illustrates a second tier of the e-mail sorting system of the present invention. Many organizations may be so large and diverse that the products and services offered by the organization are well understood by only a fraction of the personnel in the organization. Consequently, in order to provide an adequate response to a client's query, it may be necessary to get the client's query to an agent of the organization who has been particularly designated due to knowledge, training or experience as qualified to respond to client queries regarding a particular product, service or aspect of the organization.

This being the case, the web-site with an e-mail form which is filled out by a user to generate an e-mail to the organization may have some means of automatically identifying the product, service or aspect of the organization about which the client is inquiring. For example, the web-site may be organized such that different e-mail forms are accessed in response to a client's indication of the topic, product or service about which he or she wishes to inquire. Alternatively, there may be a field in the e-mail form having, for example, a pull-down menu or radio button group, that has the user specify a product, service or topic about which the e-mail message is being written.

In either case, when the e-mail message is generated and sent to the global box (104), a second meta-tag will be appended to the message. This meta-tag will specify the product, service or topic (hereinafter "topic") about which the message is written. This meta-tag is generated based on, for example, the user's selection from a list of such topics or based on the product-specific e-mail form used to generate the message.

After the incoming e-mail messages have been sorted by language, the messages may be sorted by the topic to which each refers. In a preferred embodiment of the present invention, each of the language-specific mail boxes (110-115) may reside on a particular server (120-125). That server (120-125) may access the e-mail messages and parse them for the topical meta-tag that specifies the product, service or topic about which the message was written. The server (120-125) then sorts the e-mail messages by topic and provides all those messages on a particular topic to a designated mail box (e.g., 130-132).

By way of example, all the incoming client e-mail messages in English about Topic "B" will be delivered by the system of the present invention to the mail box (131). All the incoming client e-mail messages in Japanese about Topic "C" will be routed to the mail box (135).

After the incoming client e-mail messages have been so sorted, an agent of the host organization can efficiently access and respond to the messages. For example, an agent of the organization who speaks Japanese and is qualified by training, experience or otherwise to respond to questions on Topic "A" will access the messages in the mail box (133) using an agent user interface (143), i.e. the agent's workstation. An agent user interface (140-145) is provided for each of the language-specific and topic-specific mail boxes (130-135).

In this way, e-mail from a client is quickly and automatically routed to an agent of the organization who is qualified by both common language and knowledge of the subject matter to respond to the client's inquiry. Consequently, the response to the client is intelligible, accurate and prompt, thereby engendering goodwill and fostering a positive relationship with that client.

The preceding description has been presented only to illustrate and describe the invention. It is not intended to be exhaustive or to limit the invention to any precise form disclosed. Many modifications and variations are possible in light of the above teaching. For example, while a variety of servers have been discussed at the scale on which the present invention has been illustrated, it will be understood that all the functions of the present invention could be performed by and on a single computer or server.

The present invention encompasses the computer-readable instructions inherent in the invention. As used herein, the term "computer-readable instructions" refers to software, irrespective of the computer language in which written and the level at which written (e.g. source code, object code, etc.). Computer-readable instructions also refers to firmware, i.e., any combination of software and hardwired logic.

Consequently, the present invention encompasses computer-readable instructions, recorded in a medium for recording computer-readable instructions, such as a floppy or hard disk, that cause a processor to perform the e-mail sorting and routing functions described above. As used herein, the term "processor" may refer to any device the operation of which is controlled by computer-readable instructions. This may include, but is not limited to, a host computer, a server, a microprocessor, an Application Specific Integrated Circuit (ASIC) or the like.

Figure 3:
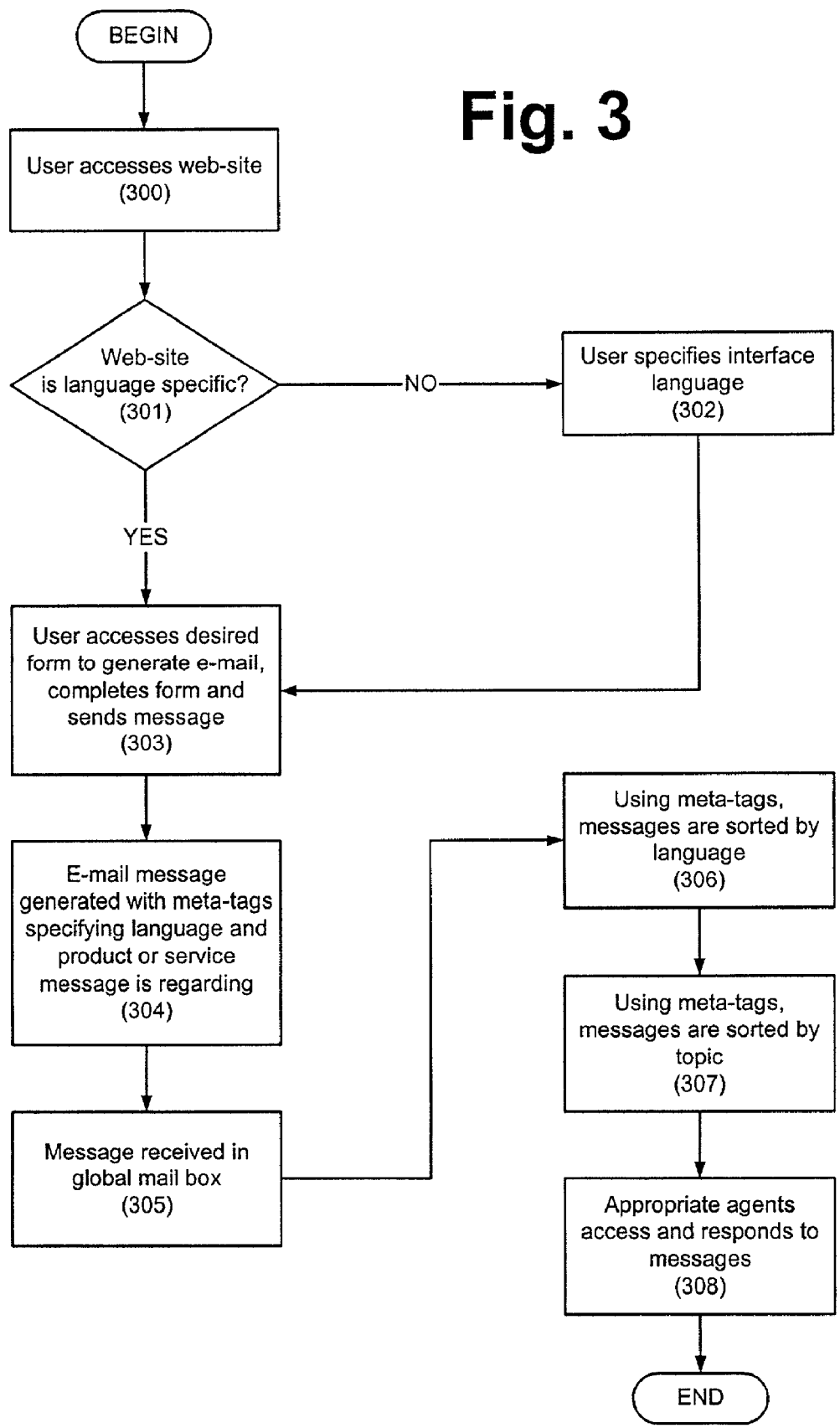
FIG. 3 is a flowchart illustrating the method of the present invention for efficiently routing client e-mail messages.

FIG. 3 is a flowchart illustrating the method and software of the present invention. As shown in FIG. 3, the user first accesses the host organization's web-site (300). The web-site may be language specific (301) so that the user must access the appropriate web-site in order to communicate in his or her language. If the web-site is not in a specific language, the user may specify the interface language desired (302). The web server will then respond with web-pages prepared in the appropriate language.

In either case, the user then accesses the web-page having a form and functionality therein for generating an e-mail message to the host organization (303). The user then completes the form and sends the message (303).

The e-mail message is generated with the meta-tags described above (304). This preferably includes a language meta-tag identifying the language in which the web-site is communicating with the client and a topic meta-tag identifying the product, service or aspect of the host organization about which the client is writing (304).

The e-mail message is received in a global mail box (305). Using the meta-tags appended to the message, the message is sorted to a language-specific mail box according to the language in which it was written (306). Again using the meta-tags appended to the message, the message is further sorted according to the topic about which the client is inquiring (307).

An appropriate human agent of the host organization can then access the sorted e-mail and respond to the client (308). As described above, the appropriate agent is one who can communicate in the client's language, i.e., the language of the e-mail message, and who is qualified by training or experience to discuss the topic about which the client has inquired on behalf of the organization.

In a preferred embodiment, the present invention can be implemented with the Kana™ e-mail system produced by Kana Communications, Inc. However, the present invention can be implemented with an e-mail system capable of intelligent message routing based on defined rules. An example of such an e-mail system is the Microsoft® Outlook system.

The preferred embodiment was chosen and described in order to best explain the principles of the invention and its practical application. The preceding description is intended to enable others skilled in the art to best utilize the invention in various embodiments and with various modifications as are suited to is the particular use contemplated. It is intended that the scope of the invention be defined by the following claims.

What is claimed is:

1. An e-mail sorting and routing system, the system comprising:
   a web server for providing a web-site at which clients generate e-mail messages to a host organization, the web server being configured to determine the language in which the web-site is written and to append a meta-tag to each e-mail message that identifies that web-site language; and
   a response server configured to sort the e-mail messages by language through reference to the appended meta-tags.

2. The system of claim 1, wherein the web server is further configured to determine a topic to which each e-mail message applies and to append a meta-tag to each e-mail message that identifies that topic, and wherein the response server is further configured to sort the e-mail messages through reference to the topic meta-tags, such that each email message is sorted first by language and then by topic.

3. The system of claim 1, further comprising a global mail box to which all messages generated at the web-site are sent for sorting.

4. The system of claim 3, wherein the global mail box operates according to Post Office Protocol 3.

5. The system of claim 1, further comprising a plurality of language-specific mail boxes into, which the e-mail messages are sorted according to language.

6. The system of claim 2, further comprising a plurality of topic-specific mail boxes into which the e-mail messages are sorted according to topic, a set of topic-specific mail boxes being associated with each of a plurality of language-specific mail boxes.

7. The system of claim 6, further comprising a plurality of agent user interfaces, each of which being associated with a topic-specific mail box, wherein a user qualified as to language and topic uses one of the interfaces to access messages in the associated topic-specific mail box.

8. A method for sorting and routing e-mail messages, the method comprising:
   sorting e-mail messages by language by: determining a language in which a web-site that receives the e-mail messages is written, appending a meta-tag to each e-mail message that identifies the web-site language, and sorting the messages through reference to the language meta-tags; and
   subsequently sorting the e-mail messages by topic by: determining a topic to which each e-mail message applies, appending a meta-tag to each e-mail message that identifies the topic, and sorting the messages through reference to the topic meta-tags.

9. The method of claim 8, further comprising sending all messages generated at the web-site to a global mail box.

10. The method of claim 8, wherein the sorting by language further comprises routing each of the e-mail messages to one of a plurality of language-specific mail boxes into which the e-mail messages are sorted according to language.

11. The method of claim 10, wherein the sorting by topic further comprises routing each of the e-mail messages from one of the language-specific mail boxes to one of a plurality of topic-specific mail boxes into which the e-mail messages are sorted according to topic, each language-specific mail box being associated with a separate corresponding set of topic-specific mail boxes.

12. The method of claim 11, further comprising accessing and responding to the e-mail messages in each of the topic-specific mail boxes.

13. An e-mail sorting and routing system comprising:
   means for sorting e-mail messages by language by: determining a language in which a web-site that receives the e-mail messages is written, appending a meta-tag to each e-mail message that identifies the web-site language, and sorting the messages through reference to the language meta-tags; and
   means for subsequently sorting the e-mail messages by topic by: determining a topic to which each e-mail message applies, appending a meta-tag to each e-mail message that identifies the topic, and sorting the messages through reference to the topic meta-tags.

14. The system of claim 13, wherein the means for sorting by language further comprise means for routing each of the e-mail messages to one of a plurality of language-specific mail boxes into which the e-mail messages are sorted according to language.

15. The system of claim 14, wherein the means for sorting by topic further comprise means for routing each of the e-mail messages from one of the language-specific mail boxes to one of a plurality of topic-specific mail boxes into which the e-mail messages are sorted according to topic, each language-specific mail box being associated with a separate corresponding set of topic-specific mail boxes.

16. Computer-readable instructions recorded in a medium for storing computer-readable instructions, the instructions for causing a computer system to:
   sort e-mail messages by language by: determining a language in which a web-site that receives the e-mail messages is written, appending a meta-tag to each e-mail message that identifies the web-site language, and sorting the messages through reference to the language meta-tags; and
   subsequently, sort the e-mail messages by topic by: determining a topic to which each e-mail message applies, appending a meta-tag to each e-mail message that identifies the topic, and sorting the messages through reference to the topic meta-tags.

17. The instructions of claim 16, wherein the instructions further cause the computer system to route each of the e-mail messages to one of a plurality of language-specific mail boxes into which the e-mail messages are sorted according to language.

18. The instructions of claim 17, wherein the instructions further cause the computer system to route each of the e-mail messages from each of the language specific mail boxes to one of a plurality of topic-specific mail boxes into which the e-mail messages are sorted according to topic, each language-specific mail box being associated with a separate corresponding set of topic-specific mail boxes.

19. The system of claim 1, wherein there is a plurality of web servers, each web server being dedicated to providing a web-site in a different language.

20. The system of claim 2, wherein a first server sorts the e-mail messages by language, and a second server sorts language-sorted e-mail messages by topic.

21. The method of claim 8, wherein sorting the e-mail messages by language is performed by a first server, and wherein subsequently sorting the e-mail messages by topic is performed by a second server.

22. The method of claim 13, wherein the means for sorting the e-mail messages by language are provided on a first server, and wherein the means for subsequently sorting the e-mail messages by topic are provided on a second server.

* * * * *

UNITED STATES PATENT AND TRADEMARK OFFICE
CERTIFICATE OF CORRECTION

| | | |
|---|---|---|
| PATENT NO. | : 7,657,640 B2 | Page 1 of 1 |
| APPLICATION NO. | : 09/746365 | |
| DATED | : February 2, 2010 | |
| INVENTOR(S) | : Jerry B. Decime | |

It is certified that error appears in the above-identified patent and that said Letters Patent is hereby corrected as shown below:

In column 7, line 25, in Claim 5, delete "into," and insert -- into --, therefor.

Signed and Sealed this

Twenty-fourth Day of August, 2010

David J. Kappos
*Director of the United States Patent and Trademark Office*